Oct. 15, 1968
E. L. MARTIN
3,405,778
INTEGRATED TRACTOR AND TRAILER
Filed May 16, 1966
4 Sheets-Sheet 1
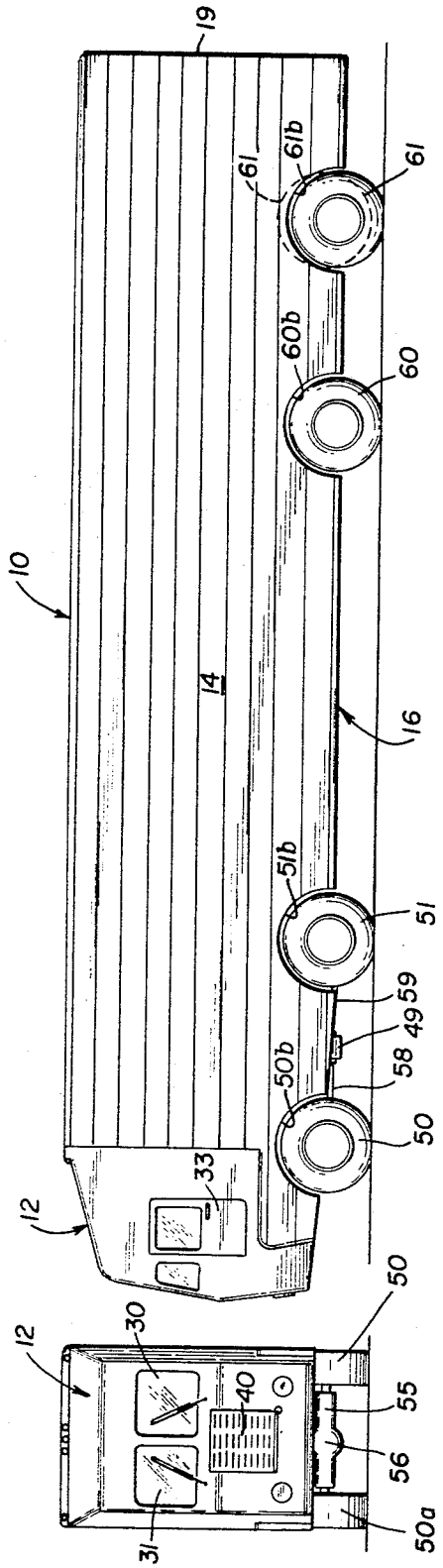
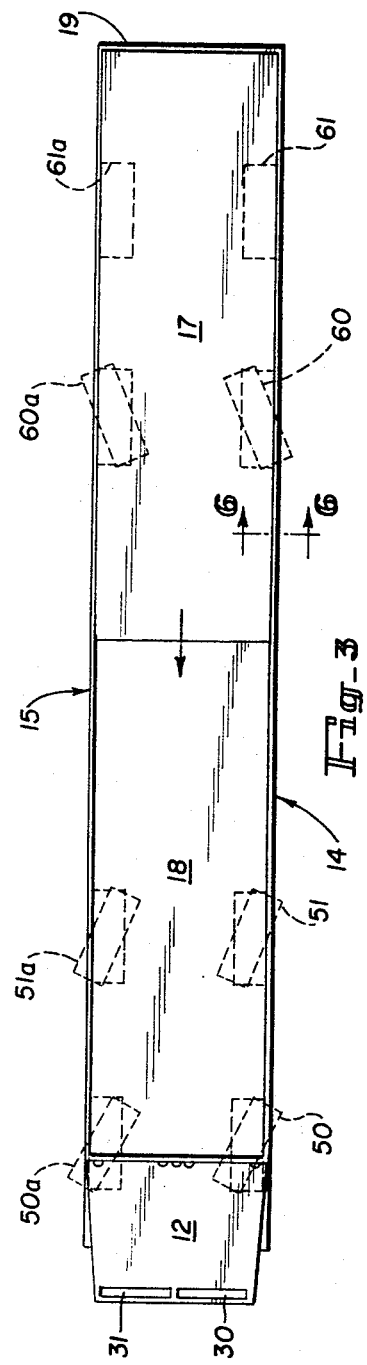
INVENTOR.
EMMET L. MARTIN
BY
*Richard D. Law*
ATTORNEY Oct. 15, 1968　　　　　　　E. L. MARTIN　　　　　　　3,405,778
INTEGRATED TRACTOR AND TRAILER
Filed May 16, 1966　　　　　　　　　　　　　　　　4 Sheets-Sheet 2

INVENTOR.
EMMET L. MARTIN
BY
Richard D. Law
ATTORNEY

Oct. 15, 1968  E. L. MARTIN  3,405,778
INTEGRATED TRACTOR AND TRAILER
Filed May 16, 1966  4 Sheets-Sheet 3

INVENTOR.
EMMET L. MARTIN
BY
Richard D. Law
ATTORNEY

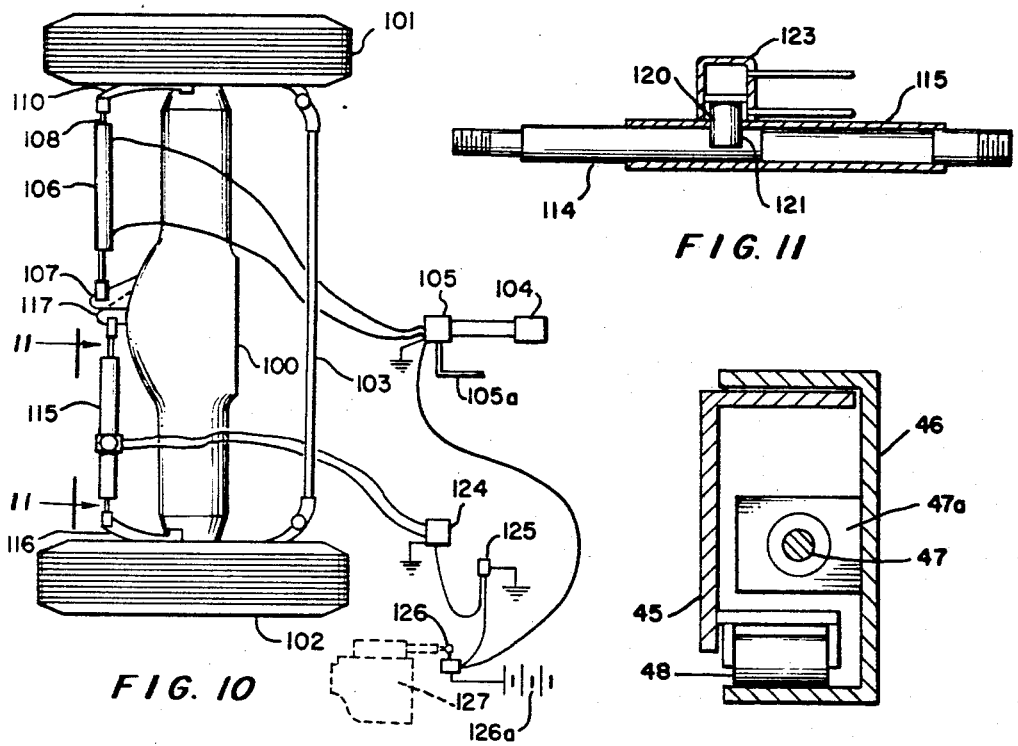
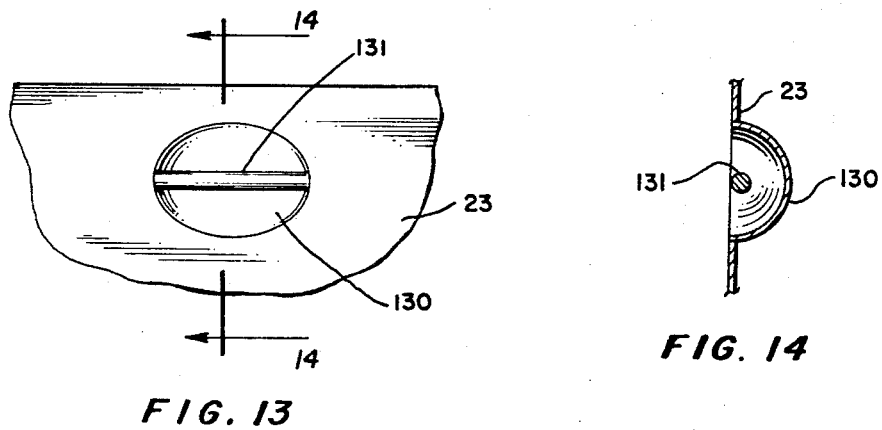

United States Patent Office 3,405,778
Patented Oct. 15, 1968

3,405,778
INTEGRATED TRACTOR AND TRAILER
Emmet L. Martin, Littleton, Colo., assignor to The American-Coleman Company, Littleton, Colo., a corporation of Nebraska
Filed May 16, 1966, Ser. No. 550,394
10 Claims. (Cl. 180—24)

ABSTRACT OF THE DISCLOSURE

An integrated tractor and trailer unit of high capacity, including a cab-over-engine and integral goods carrying body, has two or more sets of steerable drive wheels at the front of the vehicle and two or more sets of follow wheels at the rear. One set of rear wheels is steerable at low speeds, and locks in following position at higher speeds. The other set of rear wheels is retractable for use in steering the steerable rear wheels. At a predetermined capacity of goods holding body, the vehicle has a much shorter length than a conventional tractor and trailer, and eliminates jackknifing common with tractor-trailer units. The integrated tractor-trailer unit provides a high measure of safety for highway travel, greater economy in the movement of goods, and a higher maneuverability than is possible with conventional tractor-trailer units.

This invention relates to motor vehicles and more particularly to integrated tractor and trailer units for high capacity, economical and safe transportation of freight.

Heavy duty, large capacity motor vehicle freight carriers have followed a traditional design which includes a prime mover (called a tractor) and a semitrailer attached to the tractor by means of a single pivot generally referred to as a king pin or fifth wheel connection. As the necessity for increased load capacity per unit has arisen, the design of the tractor and trailer has followed previous designs and only the size of the tractor and the trailer has been increased, but very few engineering design changes have accompanied the increase in size. The king pin or fifth wheel connection, which is a major functional component for connecting the two together, has been the subject of a number of refinements, as shown in the patent art, but the inherent disadvantages and dangerous tendencies of such connections still exist. The fifth wheel connection between a tractor and a trailer permits "jackknifing" of the unit, frequently resulting in upsetting it. The jackknifing actually causes accidents, and where the jackknifing is a result of an accident it generally increases the severity of the accident. Furthermore, any substantial increase in the size of a tractor and trailer must be an increase in length due to the height and width limitations imposed by physical structure of the highway as well as by law. Some increase in height has been noted, but this is limited by the various state statutes. The increase in height, however, has raised the center of gravity and thus contributes to a more suitable unit.

The creation of interstate freeways or turnpike highway systems has led to some change in the statutes, permitting an increase in the size of trucks. Additional carrying capacity for trucks is now permitted on some roads in many States, and on certain highways some States permit the use of a trailer, called a "pup," hitched onto the rear of the semitrailer. Extensive research has shown that the wind resistance of a semitrailer greatly increased the power requirements of moving the truck along a highway. For example, in wind tunnel tests it has been demonstrated that at 50 miles per hour about 53 more horsepower are required to overcome wind resistance of the frontal area of a particular size semitrailer than for an integrated type tractor-trailer. Such size is in the commercial size range. It has further been shown that the horsepower requirement does not increase linearly with the increase in speed, but increases as the cube of the speed. For example, with the same trailer as the above, it has been shown that the energy required to overcome the wind resistance at 75 miles per hour is 179 horsepower (126 horsepower more than required at 50 miles per hour). On the highways which permit the higher speeds, the power consumption increases, and the efficiency of the unit greatly decreases since this is wasted power. With the addition of a "pup," the wind resistance is compounded, as is the horsepower requirement for overcoming this added wind resistance. Wind or air flow passing around the squared configuration of the rear ends of trucks or trailers creates a suction which produces a drag on the unit, requiring an expenditure of power to overcome the drag. The power requirements to overcome the suction are substantial.

As the size of the conventional tractor-trailer unit has increased, particularly in length, it has been necessary to add additional load supporting wheels. This usually requires the addition of another axle (including two or four wheels), either on the tractor or on the trailer, or both. The traditional design utilizes only front, steering wheels on the tractor, which are not drive wheels, and rear drive wheels on the tractor are not steerable wheels. On the trailer the wheels are "follow wheels" and are neither steerable nor driving. The distance between any two adjacent axles is set by the laws on bridging, that is, the minimum distance apart which axles may be. As the distance between the axles increases and the number of wheels increases the mobility of the unit decreases, particularly for sharp turns, backing into docks and the like.

Various attempts have been made to overcome some of the disadvantages of the traditional design of tractors and trailers. For example, a full trailer-type vehicle has been proposed in which the trailer is combined with a cab and the combined unit is connected by means of a fifth wheel to a drive bogey. The drive bogey is provided with nonsteering drive wheels and one pair of steering nondrive wheels. Turning of the vehicle is accomplished by pivoting the entire bogey (a wheeled truck) in relation to the combined cab-trailer. In another attempt, a front bogey is provided with three sets of nonsteering wheels and a rear bogey is also provided with three sets of nonsteering wheels all mounted under a combined cab and truck bed unit. Turning movement of the truck is accomplished by turning both bogies in relation to the truck, with the bogies being interconnected so as to be conjointly turned for steering movements. Obviously, any vehicle utilizing the king pin or fifth wheel connection is subject to jackknifing and the disadvantages stemming from the connection. Also, the king pin or fifth wheel pivotal arrangement requires that the connection between the two be above the tops of the wheels to provide clearance for settling and bouncing movements. This raises the center of gravity of the truck and adds to the inherent disadvantages of the fifth wheel type connection.

According to the present invention I have provided an integrated tractor-trailer unit having safety features which are not possible in conventional tractor-semitrailer units. The invention provides increased load capacity without additional length of the overall unit, reduces wind resistance and thereby reduces operational costs, has increased ease of maintenance of the power plant of the unit, etc. The invention is a combined tractor and trailer formed as a single body unit having one or more sets of front independent steerable drive wheels and one or more sets of steerable, rear, follow-wheels which are nondriving, but which are arranged for steering only in a low gear or a reverse gear. The independently mounted drive axles dispense with the use of the king pin or fifth wheel connection, thereby eliminating the major hazard of jackknifing. The front wheel drive increases traction on ice or slippery roads and increases traction for stopping or slowing down, thereby increasing the overall safety of the operation of the vehicle. The design permits a much lower floor for the cargo area, which decreases the height of the center of gravity and increases the stability of the unit. The power plant and transmission for the unit is mounted on rails which may be withdrawn or installed as a package unit complete with engine, radiator, transmission and auxiliary components. The device is arranged for a "cab over" power plant, and it is installed or withdrawn from the front of the vehicle, sliding on rails mounted on or as part of the vehicle itself. Reinforcing or roll bars are provided in the operator's compartment for safety to the operating personnel.

Included among the objects and advantages of the present invention is to provide an integrated tractor and trailer unit, having front steerable drive wheels, greater capacity per unit of length, and with increased economy of operation. The unit of the invention reduces hazards found in conventional tractor and semitrailer units and provides additional safety devices not available in such conventional tractor-semitrailer units. The unit of the invention has a lowered center of gravity and a construction which permits the use of removable, multiple floors in the cargo section for holding layers of the same or different types of cargo. Additionally, the unit of the invention may be converted for legally hauling passengers with greater safety and with increased capacity per unit length. The invention provides for a front installation or withdrawal of a unitized power plant and transmission combination which provides ease of maintenance and a fast engine change where necessary.

These and other objects and advantages of the invention may be readily ascertained by referring to the following description and appended illustrations in which:

FIG. 1 is a side elevational view of an integrated tractor-trailer unit according to the invention, illustrating a four axle embodiment;

FIG. 2 is a front elevational view of the device of FIG. 1;

FIG. 3 is a schematic top plan view of the unit of FIG. 1;

FIG. 10 is a schematic top view of a conventional remote hydraulic steering mechanism for one set of rear wheels;

FIG. 11 is a detailed view, in partial section, of a conventional lock system of the steering mechanism of FIG. 10, taken along section lines 11—11;

FIG. 12 is an enlarged detailed view of the jack screw and engine support system of FIG. 5, taken along section lines 12—12;

FIG. 13 is a front elevational view of one form of conventional tie-down anchor; and FIG. 14 is a cross-sectional view thereof, taken on section line 14—14.

Figure 4:
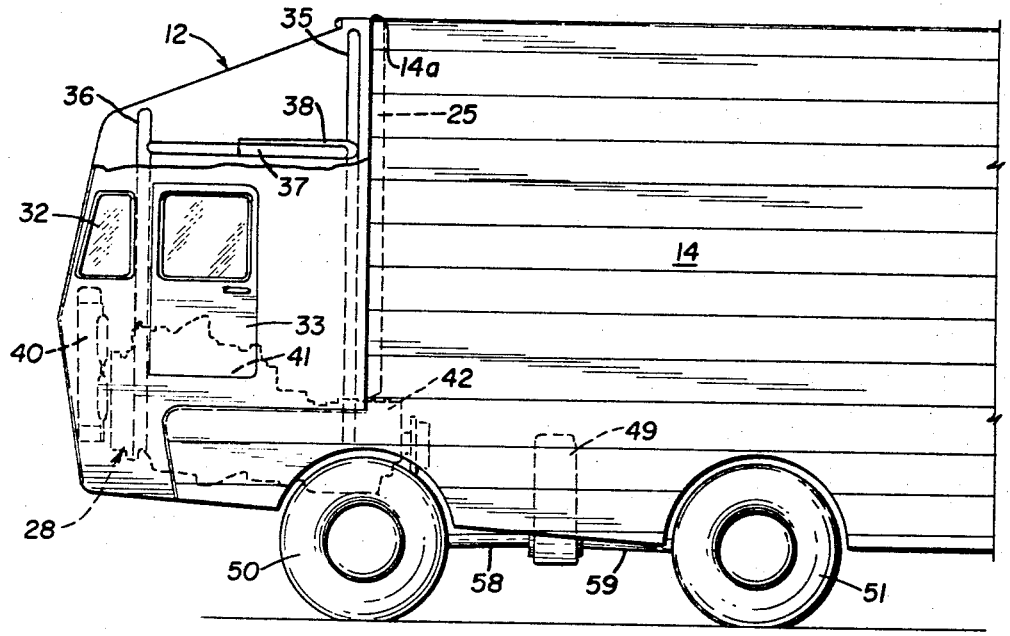
FIG. 4 is a detail view of the front of the device of FIG. 1, illustrating the driver's compartment and the unitized engine-transmission component.

In the device shown in the drawings, which are intended for illustrative purposes only, an integrated vehicle is shown with an enclosed cargo body 10 integrally attached to a cab section 12. The cargo body or compartment includes sides 14 and 15, which are preferably made of panels of very high strength steel, and are preferably of a sandwich type. Such construction is conventional, generally of a honeycomb center or center braced, which permits replacing of damaged panels on both the interior and the exterior of the vehicle. The steel has a very high tensile strength and permits the use of thin sheets for the panel sections, providing increased strength of the vehicle body without added weight. The floor 16 may be of conventional design, and may be either beamed or trussed. Preferably, the major portion of the floor is well below the top of the vehicle wheels, which reduces the center of gravity, providing increased safety for the vehicle. The top is formed in two sections 17 and 18, of which the section 18 is solid and the section 17 may be removed or is slidable over or under the top portion 18, to permit top loading of various types of cargo into the vehicle. At the rear end 19 of the truck, conventional doors may be provided.

Figure 6:
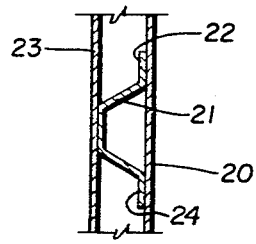
FIG. 6 is a cross-sectional view of a portion of the wall of cargo compartment taken along section line 6—6 of FIG. 3.

In one type of sandwich construction for the sides of the truck, shown in FIG. 6, an exterior panel 20 is welded, riveted or otherwise secured to a channel 21 having outwardly extending flanges 22 on the leg portions of the channel. An inner panel 23 is, likewise, welded or otherwise secured to the web 24 of the channel, forming a sandwich construction. By providing holes or slots in panel 23 into the web 24 of the channel 21, tie-down-cable anchors may be secured to the channel or pins placed in such openings to support a floor for multiple floors for the vehicle. One simple conventional tie-down anchor is shown in FIGS. 13–14, wherein an arcuate recess 130 is secured in an accommodating aperture in the wall 23. A cross bar 131 is secured across the recess, providing a means for anchoring tie-down straps or the like. Obviously, any other suitable tie-down anchor may be used.

In addition to conventional doors at the rear of the truck and the sliding top 18, side doors may be provided to aid loading or unloading of such vehicles. Further, as is conventional with trucks, the cargo area, particularly the floor, should be of such strength to support fork lift trucks or other mechanical cargo carriers. In the configuration shown, wheel wells for the vehicle wheels must be provided which extend in the cargo space but space is available to provide sufficient passageway between the wells for such mechanical cargo carriers. The greater safety advantage of having a lower center of gravity more than compensates for the disadvantage of the wheel wells. While wheel wells are suggested, it is not intended that the design precludes a level floor. At the forward end 14a of the cargo compartment a double bulkhead 25 is provided for strength to prevent loose cargo loads from catapulting from the cargo space into the driver's compartment in the event of accidents or sudden stops. This bulkhead is preferably made of the same type of high strength steel as the sides for the added strength. Several very high tensile strength steels are commercially available, and sheets of the same are considerably stronger than normally used sheet steel. The bulkhead may be rigidly secured to the walls and top of the truck to withstand pressures from loose cargoes.

The driver's compartment 12 also includes an engine compartment 29 for an engine package 28 mounted on tracks, as explained below. The driving compartment includes windshields 30 and 31 which may be split, as shown, or may be solid if desired. Side windows 32 may be used to provide added vision for the driver, and two doors 33 provide access to and from the cab. The position of the driver provides maximum forward and side visibility for safety. The outline of the cab is essentially streamlined to cut down wind resistance, and since the cargo carrying body is part of the cab there is no frontal wind resistance other than from the cab frontal area. A rear roll bar 35 may be rigidly secured to the frame of the truck, a similar roll bar 36 at the forward part of the cab may, also, be rigidly secured to the frame, and a diagonal cross brace (not shown) anchors roll bars 35 and 36 together to provide protection for the drivers in the event the truck is upset. Such roll bars are known in racing-type vehicles, and they may be of similar construction for the present purposes. A cross frame 37 between the roll bars 35 and 36 provides means for a sleeping compartment for an extra driver, with a sleeping shelf 38 mounted thereon. Additionally, the bulkhead 25 may be part of the roll bar 35 or attached to it. The engine package 28 is mounted in the lower part of the driving compartment and should be properly shielded by means of insulating walls and partitions from the driving compartment. The driver's seat is conventionally on the left side of the engine, as is the case with cab-over-engine type trucks. For comfort of the drivers of the vehicle, the cab may be both heated and air conditioned.

Figure 5:
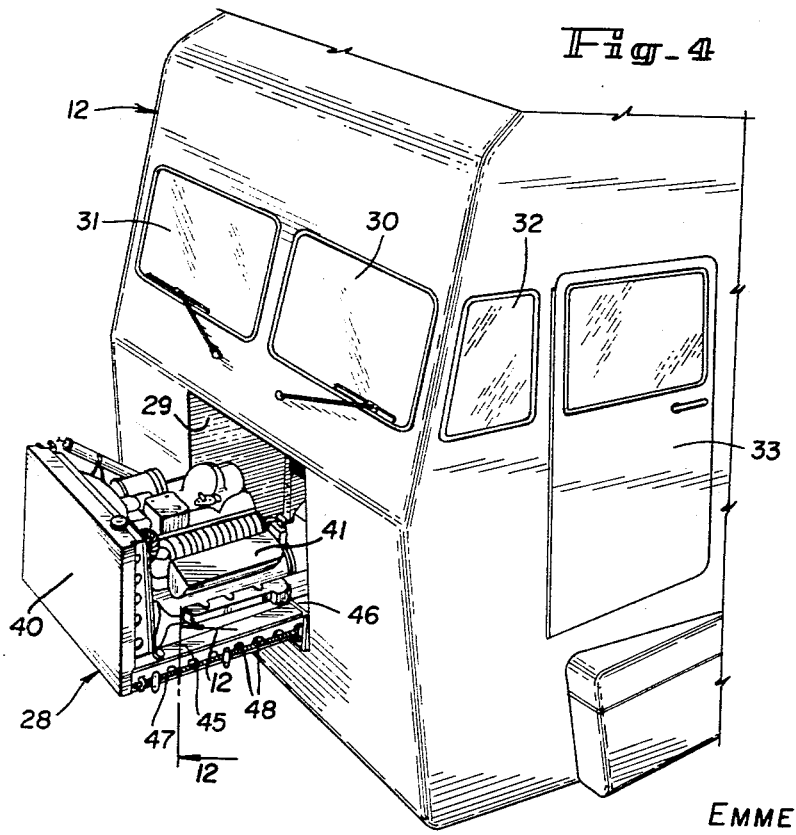
FIG. 5 is a detail, perspective view of the operator's cab of the device of FIG. 1, illustrating the installation and withdrawal of the unitized engine and transmission component.

The engine package 28 includes a coolant radiator 40, an engine 41 and a transmission 42, all mounted as a packaged unit on rails 45 which extend along each side of the engine and transmission unit. The rails are arranged to telescope in channels 46 which are a part of the frame of the vehicle. For convenience of moving the engine package into and out of the truck a jackscrew 47 is provided on each side of the vehicle. A plurality of rollers 48 permits the engine tracks to roll freely in channels 46 on turning the jackscrew 47 in threaded anchor 47a attached to the channels so as to be easily moved by means of the jackscrews at each side. The engine package may, therefore, be easily moved into and out of the engine compartment, and by providing sufficient lengths of electrical cable, flexible fuel lines, and flexible operating linkage, such as the accelerator, etc., the engine may be fully exposed for maintenance in the position shown in FIG. 5. For a complete engine change or a major overhaul the engine package can be completely withdrawn by disconnecting the operating lines and linkages connected between it and the driver's compartment. Thus, the engine package may be quickly withdrawn by only a few members being disconnected. A new engine package may replace the withdrawn engine package or the removed engine package may be taken intact to a bench for overhaul or other repairs. One of the advantages achieved is that the power plant is removed as a unit and in the condition as it was used in the vehicle, so a mechanic may check the engine as actually used, including all of its major components. In addition, a relatively inexpensive dynamometer may be used to check the engine operation in place of a more expensive, conventional truck dynamometer.

Figure 8:
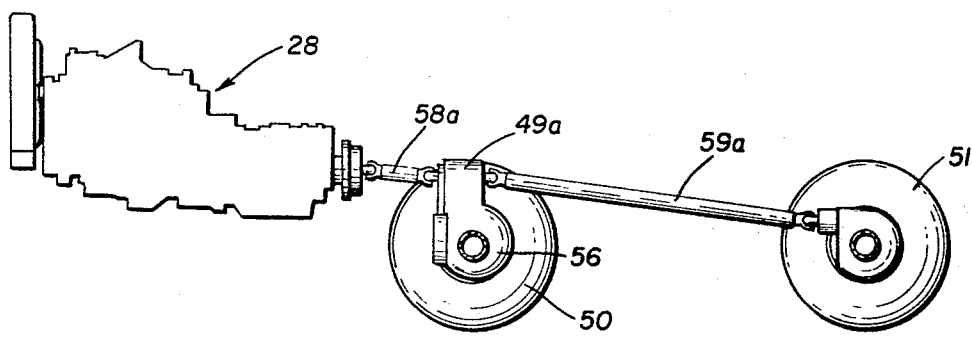
FIG. 8 is a view of an alternate form of a power train.

A transfer case 49 may be used to drive two front steerable drive axles, one of which is shown in FIG. 2 as axle 55 having a differential 56. A propeller shaft 58 would connect the transfer case to the front differential and a propeller shaft 59 would connect the transfer case 49 to the rear differential, which is not illustrated in the drawings. Such connections are conventional. FIGURE 8 indicates an alternate method of driving directly from transmission to the front axle power divider. Such drives are conventional. The front propeller shaft 58a provides a connection between the transmission and connector 49a. A rear propeller shaft 59a provides a drive for the rear set of drive wheels and the connector 49a.

The steerable drive axles are independently suspended on the truck frame, which eliminates a king pin or fifth wheel connection for the wheels. Both sets of front wheels, i.e., 50–50a and 51–51a mounted in wheel wells 60a and 61a, respectively are steerable, as shown in FIG. 3, which provides excellent mobility for the vehicle on the highway with commercially available steerable drive wheels. Preferably, the differentials are of the "no spin" type which provides positive traction to both of the wheels rotated by the differential. Such no spin differentials are commercially available and further description is not believed necessary. The two sets of steerable drive wheels may be controlled by conventional means, usually mechanically or hydraulic, and are so interconnected as to provide the correct angle of turn to prevent scuffing or sliding of any of the wheels.

Figure 9:
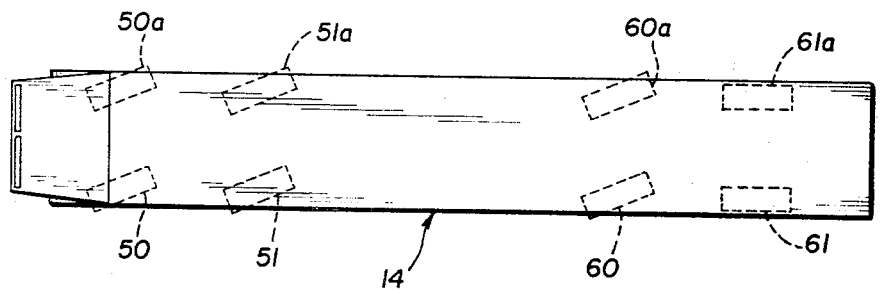
FIG. 9 is a schematic diagram which indicates an oblique mode of steering.

The device of the invention is provided with one or more sets of steerable drive wheels in front. One or more sets of follow wheels 60 and 61 mountd in wheel wells 60b and 61b, respectively, are provided at the rear of the truck, follow wheels meaning they are nondriving wheels. The distance apart of any sets of wheels is generally controlled by law, commonly referred to as a bridging law, and such a vehicle, of course, must conform to such laws. For increased mobility, in low forward speeds or in reverse speeds, one or more sets of the rear follow wheels may be made steerable. For this purpose, for example, the wheels 60 and 60a may be made steerable, with the steering accomplished by hydraulic or mechanical means from the driver's compartment. To prevent scuffing of the rear wheels 61 and 61a they may be made retractable, raising them a sufficient height to prevent scuffing of the tires during turning movements. The wheels may be raised, as for example, by hydraulic or mechanical means, and detailed construction of the same is not believed necessary since retractable wheels are known. One mechanical means for raising one set of the follow wheels is shown in U.S. Patent No. 1,802,366, issued Apr. 28, 1931, to K. F. Adamson, entitled "Vehicle." Preferably, the steering of the wheels 60 and 60a should only be possible when the vehicle is in a low forward gear or in a reverse gear. This may be easily accomplished by conventional methods, which lock out the steering mechanism and hold the steerable rear wheels in direct follow position when the transmission is in gears other than a low or a reverse gear. In FIGS. 10 and 11 one form of a steerable set of rear wheels is shown. An axle housing 100 supports an axle (not shown) on which are mounted pivotal wheels 101 and 102 (which correspond to wheels 60 and 60a of FIGS. 1, 3 and 9). A tie rod 103 joins the wheels together for conjoint steering movement for turning. A hydraulic cylinder 106, of the double action type, is connected by one end to ear 107 secured to the housing 100. A piston rod 108 extending from the other end of the cylinder is connected to steering arm 110 secured to the wheel 101. Actuation of the cylinder moves the piston one way or the other to pivot wheel 101, and through the tie rod 103, the opposite wheel 102. A hydraulic valve solenoid control 105 is actuated by the operator in the cab by means of lever 105a admitting hydraulic fluid under pressure to one side of the piston and relieving hydraulic fluid pressure on the other side, from and to a pump-reservoir combination 104. One form of a steering lock includes a lock bar 114 reciprocably mounted in housing 115 which is secured to arm 116 mounted on wheel 102. The lock bar is secured by its exposed end to ear 117 mounted on housing 100. A lock pin 120 is arranged to move into hole 121 in bar 114 to lock the wheels in straight follow position and to move out of the hole for steering. Movement of the lock pin is provided an air cylinder 123, of the double action type, controlled by an air valve solenoid 124, which is actuated by an air valve solenoid switch 125 in the operator's cab. The air valve solenoid is locked except in low or reverse gears, and for a lock-out a microswitch 126, mounted on a gear shift lever console 127 controls the solenoid. The microswitch disconnects the solenoid switch circuit from battery 126a (or other source of current), except when the gear shift lever is in low or reverse positions, inactivating both the hydraulic steering on the steering lock. On movement of the gear shift out of low or reverse, the steering is locked and the wheels are follow wheels. Several types of remote steering and lock-out mechanism are conventional, and available on the market. One commercial type has been used for a number of years by the American-Coleman Company, assignee of this application. Another type of remote steering by hydraulic cylinders and manually operated control valves is shown in U.S. Reissue Patents No. 25,126 and No. 25,291. The steering of the wheels 60 and 60a is preferably independent of the steering of the front drive wheels to permit a decreased radius-of-curvature turn by steering the rear wheels in an opposite direction, for example, as shown in FIG. 3. Another mode of steering is available by steering all steerable wheels in the same direction allowing the vehicle to move obliquely in either direction as shown in FIG. 9.

In the illustrations, the invention is shown with an approximate configuration of a 55′ long by 8′ wide vehicle. This can provide a cargo space which is approximately 35% greater in volume than a conventional tractor and semitrailer of the same length. The lower height of the floor provides means for stacking loads, and particularly putting heavy loads on the bottom and light material above on removable decks, to provide a lower center of gravity. Further, with just one projected frontal area of the vehicle instead of two as with a tractor-semitrailer unit, the wind resistance is substantially reduced, increasing the economy of the operation of the vehicle.

Figure 7:
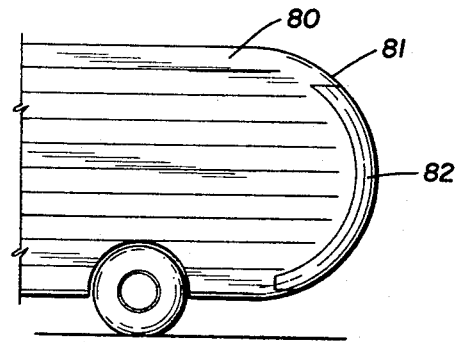
FIG. 7 is a side elevational view of the rear end of modified truck unit showing a streamlined configuration.

In FIG. 7 the rear end of a truck 80 is shown with one possible streamlined contour 81 for a smooth air flow around the truck to reduce aerodynamic drag during road operation. A curved door 82 closes the back end, and the curve conforms to the curved outline of the truck. For some trucks, the streamlined effect need not be as severe, and may be accomplished by less critical revisions such as by rounding or tapering the square edges to provide a smoother air flow with reduced drag.

All external surfaces (including the under body) are designed to provide a minimum air resistance and yield minimum aerodynamic drag. This design provides for independent suspension of back axle eliminating the added weight of front and rear tandem "bogey" suspension.

While the invention has been illustrated by reference to specific embodiments, there is no intent to limit the spirit or scope of the invention to the precise details so set forth except as defined in the following claims.

I claim:

1. An integrated tractor and trailer combination comprising a body having an operator's cab integrally attached to an enclosed cargo carrying body, there being an engine compartment including an engine and transmission below said cab; at least one set of steerable drive wheels mounted at the front of said body and spaced a substantial distance rearwardly from the front edge thereof; at least one set of follow wheels mounted adjacent to the rear of said body; said follow wheels being arranged to be steerable only when the transmission of said tractor and trailer combination is in a low gear or a reverse gear; at least one roll bar integrally mounted in said body and mounted in said cab section for the protection of a driver; said engine and said transmission package mounted on rails and arranged to move horizontally into and out of said engine compartment in said cab; means for a driveline connecting said front steerable drive wheels to said transmission; and means for locking said rear wheels in nonsteer follow position when said transmission is in a gear other than a low or a reverse gear.

2. An integrated tractor and trailer according to claim 1 wherein said at least one set of steerable drive wheels are two pairs of longitudinally spaced-apart steerable drive wheels mounted adjacent the front of said unit.

3. An integrated tractor and trailer according to claim 1 wherein said at least one set of follow wheels are pairs of longitudinally spaced-apart follow wheels mounted in the rear of said unit, and the rearmost wheels being retractable.

4. An integrated tractor and trailer according to claim 1 wherein said at least one set of steerable drive wheels comprises two pairs of longitudinally spaced-apart steerable drive wheels mounted adjacent the front of the unit and said at last one set of follow wheels comprises two pairs of longitudinally spaced-apart non-drive wheels mounted adjacent the rear of said unit, the rearmost of said follow wheels being retractable.

5. An integrated tractor and trailer according to claim 1 wherein said engine and transmission is movable as a unit from within said engine compartment to a fully exposed position of said engine, and is additionally removable from said body.

6. An integrated tractor and trailer according to claim 1 wherein said cargo carrying body is provided with removable means in the wall thereof for supporting multiple floors.

7. An integrated tractor and trailer according to claim 1 wherein at least two spaced-apart roll bars are mounted in said cab section for protection of the occupants thereof.

8. An integrated tractor and trailer according to claim 7 wherein lateral braces are mounted between said at least two roll bars and a sleeping shelf is provided thereon.

9. An integrated tractor and trailer according to claim 1 in which all external surfaces are streamlined to reduce wind resistance and drag.

10. An integrated tractor and trailer according to claim 1 in which a major portion of the floor of said cargo body being mounted lower than the top of said wheels and being provided with wheel wells to accommodate said wheels at the front and rear of said body.

References Cited

UNITED STATES PATENTS

| | | | |
|---|---|---|---|
| 1,802,366 | 4/1931 | Adamson | 180—22 |
| 1,893,609 | 1/1933 | Austin | 180—64 |
| 2,035,212 | 3/1936 | Alborn | 180—64 |
| 2,773,304 | 12/1956 | Fageol | 180—89 |
| 2,855,064 | 10/1958 | McCullough | 180—22 X |

FOREIGN PATENTS

| | | |
|---|---|---|
| 470,277 | 6/1914 | France. |
| 553,185 | 5/1943 | Great Britain. |

A. HARRY LEVY, *Primary Examiner.*